United States Patent
Shimoshimano et al.

(10) Patent No.: US 10,764,426 B2
(45) Date of Patent: Sep. 1, 2020

(54) TERMINAL DEVICE AND RECORDING MEDIUM FOR ORIGINATING SIGNALS

(71) Applicant: JVCKENWOOD Corporation, Yokohama-shi, Kanagawa (JP)

(72) Inventors: Hideo Shimoshimano, Yokohama (JP); Ichiro Shishido, Yokohama (JP)

(73) Assignee: JVCKENWOOD CORPORATION, Yokohama-shi (JP)

( * ) Notice: Subject to any disclaimer, the term of this patent is extended or adjusted under 35 U.S.C. 154(b) by 0 days.

(21) Appl. No.: 16/592,800

(22) Filed: Oct. 4, 2019

(65) Prior Publication Data

US 2020/0112632 A1    Apr. 9, 2020

(30) Foreign Application Priority Data

Oct. 5, 2018   (JP) .................................. 2018-189846

(51) Int. Cl.
| | |
|---|---|
| *H04W 88/02* | (2009.01) |
| *H04M 3/22* | (2006.01) |
| *H04W 4/10* | (2009.01) |

(52) U.S. Cl.
CPC ........... *H04M 3/2218* (2013.01); *H04W 4/10* (2013.01); *H04W 88/02* (2013.01)

(58) Field of Classification Search
CPC ...... H04W 3/2218; H04W 4/10; H04W 88/02
USPC ................................................ 455/518, 517
See application file for complete search history.

(56) References Cited

U.S. PATENT DOCUMENTS

| | | | | |
|---|---|---|---|---|
| 4,939,772 A | * | 7/1990 | Goto .................. | H04N 1/32704 379/100.16 |
| 5,091,877 A | * | 2/1992 | Itoh ........................ | H04H 60/94 379/92.04 |
| 5,521,974 A | * | 5/1996 | Hayashi .................. | H04M 1/56 379/100.06 |
| 5,818,903 A | * | 10/1998 | Han ...................... | H04M 3/323 379/1.01 |
| 5,926,537 A | * | 7/1999 | Birze .................... | H04M 1/663 379/229 |
| 6,122,484 A | * | 9/2000 | Fuller ................... | H04M 1/006 340/7.28 |

(Continued)

FOREIGN PATENT DOCUMENTS

JP    2011135290 A    7/2011

*Primary Examiner* — Hai V Nguyen
(74) *Attorney, Agent, or Firm* — Brundidge & Stanger, P.C.

(57) ABSTRACT

An acquisition unit acquires a reference time that is a reception time when a signal was received from another terminal or a call origination time when the other terminal device transmitted a signal. A storage stores a call origination time when a signal was transmitted to the other terminal device. A controller selects, by referring to the reference time acquired by the acquisition unit and the call origination time stored in the storage, a first communication mode in which communication is started after a predetermined user operation is performed in the other terminal device or a second communication mode in which communication is started even when the predetermined user operation is not performed in the other terminal device. A communication unit transmits a signal to the other terminal device in accordance with the communication mode selected by the controller.

8 Claims, 14 Drawing Sheets

| RECORD NO. | CALL ORIGINATION TIME | RECEPTION TIME | CALL ORIGINATION ASSISTANCE STATUS |
|---|---|---|---|
| 001 | 10:10:11 | | 0 |
| 002 | 10:11:00 | | 0 |
| 003 | | 10:11:13 | 0 |
| 004 | 10:20:03 | | 0 |
| 005 | | 10:20:26 | 0 |
| 006 | 10:25:41 | | 0 |
| 007 | 10:31:12 | | 0 |
| 008 | | 10:31:25 | 0 |
| 009 | | 10:32:10 | 0 |
| 010 | 10:34:51 | | 0 |
| 011 | | 10:35:05 | 0 |
| 012 | 10:41:14 | | 0 |
| 013 | 10:47:21 | | 0 |
| 014 | 10:58:21 | | 0 |
| 015 | 11:00:00 | | 1 |
| 016 | 11:02:27 | | 1 |
| 017 | 11:05:31 | | 1 |
| 018 | | 11:05:50 | 0 |
| 019 | 11:10:14 | | 0 |
| 020 | 11:40:15 | | 0 |
| 021 | 12:20:25 | | 0 |
| 022 | 12:45:24 | | 1 |
| 023 | 12:48:30 | | 1 |
| 024 | 12:51:23 | | 1 |
| 025 | | 12:52:17 | 0 |
| 026 | 13:02:23 | | 0 |
| 027 | | 13:03:41 | 0 |
| 028 | 13:15:25 | | 0 |
| 029 | | 13:16:41 | 0 |
| 030 | | 13:24:34 | 0 |

(56) References Cited

U.S. PATENT DOCUMENTS

| | | | | |
|---|---|---|---|---|
| 6,205,338 B1* | 3/2001 | Kim | ............... | H04M 1/72513 455/462 |
| 6,424,647 B1* | 7/2002 | Ng | ............... | H04L 29/06 370/352 |
| 6,574,335 B1* | 6/2003 | Kalmanek, Jr. | ... | H04M 3/42017 379/27.02 |
| 7,006,622 B2* | 2/2006 | Laine | ............... | H04M 19/041 379/373.01 |
| 7,286,842 B2* | 10/2007 | Li | ............... | H04B 7/2668 370/278 |
| 7,336,777 B2* | 2/2008 | Lee | ............... | H04M 3/42017 379/207.08 |
| 7,471,783 B1* | 12/2008 | Shen | ............... | H04M 3/42017 370/403 |
| 8,036,608 B2* | 10/2011 | Holm | ............... | B66B 1/40 455/90.2 |
| 8,150,334 B2* | 4/2012 | Albertsson | ............... | H04W 4/10 455/90.2 |
| 8,170,194 B2* | 5/2012 | Shen | ............... | H04M 3/42017 348/14.01 |
| 8,175,252 B2* | 5/2012 | Batni | ............... | H04M 3/42017 379/257 |
| 8,244,229 B2* | 8/2012 | Lindfors | ............... | H04M 3/42017 455/418 |
| 8,300,796 B2* | 10/2012 | Mani | ............... | H04M 3/02 379/201.01 |
| 8,331,876 B2* | 12/2012 | Lee | ............... | H04W 4/10 455/90.2 |
| 9,800,717 B2* | 10/2017 | Ma | ............... | H04M 1/72577 |
| 10,193,727 B1* | 1/2019 | Sung | ............... | H04L 5/0007 |
| 10,575,128 B2* | 2/2020 | Suzuki | ............... | H04W 4/025 |
| 2005/0207555 A1* | 9/2005 | Lee | ............... | H04M 3/42017 379/207.16 |
| 2006/0023862 A1* | 2/2006 | Sutcliffe | ............... | H04M 3/42017 379/257 |
| 2006/0123089 A1* | 6/2006 | Cahn | ............... | H04W 4/12 709/206 |
| 2006/0147021 A1* | 7/2006 | Batni | ............... | H04M 3/42017 379/221.08 |
| 2006/0258405 A1* | 11/2006 | Gonzalez | ............... | H04M 19/04 455/567 |
| 2007/0116251 A1* | 5/2007 | Seo | ............... | H04M 3/4878 379/372 |
| 2007/0121821 A1* | 5/2007 | Su | ............... | H04M 3/42042 379/88.13 |
| 2007/0207782 A1* | 9/2007 | Tran | ............... | H04M 3/42093 455/414.1 |
| 2007/0281681 A1* | 12/2007 | Holm | ............... | B66B 1/40 455/422.1 |
| 2007/0286372 A1* | 12/2007 | DeMent | ............... | H04M 3/42017 379/142.01 |
| 2007/0287477 A1* | 12/2007 | Tran | ............... | H04L 67/06 455/466 |
| 2007/0291931 A1* | 12/2007 | DeMent | ............... | H04M 3/42017 379/418 |
| 2007/0298768 A1* | 12/2007 | Lee | ............... | H04W 4/10 455/412.1 |
| 2008/0045239 A1* | 2/2008 | Sun | ............... | H04M 3/42017 455/456.1 |
| 2008/0153499 A1* | 6/2008 | Lindfors | ............... | H04W 76/12 455/445 |
| 2008/0253536 A1* | 10/2008 | Wang | ............... | H04M 3/42017 379/87 |
| 2009/0185665 A1* | 7/2009 | Chen | ............... | H04M 3/42153 379/29.01 |
| 2009/0238354 A1* | 9/2009 | Mani | ............... | H04M 3/02 379/201.02 |
| 2009/0262916 A1* | 10/2009 | Tao | ............... | H04M 3/42017 379/207.16 |
| 2010/0054428 A1* | 3/2010 | Wang | ............... | H04M 3/42102 379/87 |
| 2010/0080361 A1* | 4/2010 | Houghton | ............... | H04M 7/0027 379/87 |
| 2011/0076982 A1* | 3/2011 | Li | ............... | H04L 65/1016 455/404.1 |
| 2012/0106717 A1* | 5/2012 | Dong | ............... | H04M 3/42093 379/70 |
| 2014/0221034 A1* | 8/2014 | Renko | ............... | H04W 76/45 455/518 |
| 2017/0311068 A1* | 10/2017 | Shin | ............... | G10L 25/78 |
| 2018/0242110 A1* | 8/2018 | Suzuki | ............... | H04W 4/024 |

* cited by examiner

| RECORD NO. | CALL ORIGINATION TIME | RECEPTION TIME | CALL ORIGINATION ASSISTANCE STATUS |
|---|---|---|---|
| 001 | 10:10:11 | | 0 |
| 002 | 10:11:00 | | 0 |
| 003 | | 10:11:13 | 0 |
| 004 | 10:20:03 | | 0 |
| 005 | | 10:20:26 | 0 |
| 006 | 10:25:41 | | 0 |
| 007 | 10:31:12 | | 0 |
| 008 | | 10:31:25 | 0 |
| 009 | | 10:32:10 | 0 |
| 010 | 10:34:51 | | 0 |
| 011 | | 10:35:05 | 0 |
| 012 | 10:41:14 | | 0 |
| 013 | 10:47:21 | | 0 |
| 014 | 10:58:21 | | 0 |
| 015 | 11:00:00 | | 1 |
| 016 | 11:02:27 | | 1 |
| 017 | 11:05:31 | | 1 |
| 018 | | 11:05:50 | 0 |
| 019 | 11:10:14 | | 0 |
| 020 | 11:40:15 | | 0 |
| 021 | 12:20:25 | | 0 |
| 022 | 12:45:24 | | 1 |
| 023 | 12:48:30 | | 1 |
| 024 | 12:51:23 | | 1 |
| 025 | | 12:52:17 | 0 |
| 026 | 13:02:23 | | 0 |
| 027 | | 13:03:41 | 0 |
| 028 | 13:15:25 | | 0 |
| 029 | | 13:16:41 | 0 |
| 030 | | 13:24:34 | 0 |

| year | 2016 | | | | | | | | | | | | | | | | | | | | | |
|---|---|---|---|---|---|---|---|---|---|---|---|---|---|---|---|---|---|---|---|---|---|---|
| month | 10 | | | | | | | | | | | | | | | | | | | | | |
| day | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0:00:00 | | | | | | | | | | | | | | | | | | | | | | |
| 1:00:00 | | | | | | | | | | | | | | | | | | | | | | |
| 2:00:00 | | | | | | | | | | | | | | | | | | | | | | |
| 3:00:00 | | | | | | | | | | | | | | | | | | | | | | |
| 4:00:00 | | | | | | | | | | | | | | | | | | | | | | |
| 5:00:00 | | | | | | | | | | | | | | | | | | | | | | |
| 6:00:00 | | 1 | | | | | | | | | | | | | | | | | | | | |
| 7:00:00 | | | | | | | | 1 | | | | | | | | 1 | | | | | | |
| 8:00:00 | | 1 | | | | | | | | | | | | | | | | | | | | |
| 9:00:00 | | | | | | | | | | | | | | | | 2 | | | | | | |
| 10:00:00 | | | | | | | | | | | | | | | | | | | | | | |
| 11:00:00 | | 1 | | | | 1 | | 1 | | 2 | 1 | | | 1 | 2 | | | | 1 | | | |
| 12:00:00 | 2 | 1 | 3 | | 2 | 1 | | | 2 | 4 | 1 | 3 | | 1 | 3 | 2 | 1 | 2 | 1 | | | 1 |
| 13:00:00 | 3 | 3 | 2 | 3 | 2 | | 2 | 3 | 3 | 1 | 3 | 2 | | 1 | 1 | 1 | 4 | 2 | | | 1 | 2 |
| 14:00:00 | 2 | 1 | 1 | 1 | 1 | | | 1 | | 3 | 1 | 2 | 1 | | 2 | 3 | 2 | 4 | | 1 | | 4 |
| 15:00:00 | | | 1 | 2 | 3 | 1 | | 2 | 3 | 2 | 2 | 3 | | 1 | 1 | 2 | | 1 | | 1 | | 2 |
| 16:00:00 | | 1 | | | | | | 1 | | 1 | | | | | | | | | | | | |
| 17:00:00 | | | | | | | | | | | | | | | | | | | | | | |
| 18:00:00 | | | | | | | | | | | | | | | | 1 | | | | | 1 | 1 |
| 19:00:00 | | 1 | | | 1 | | | | | 2 | | 3 | | | | 3 | | | 2 | 1 | | 1 |
| 20:00:00 | 2 | 3 | 1 | 2 | 4 | | | 3 | 1 | 1 | 2 | 1 | | | 2 | 3 | 4 | 1 | | 1 | | 2 |
| 21:00:00 | 3 | 2 | 3 | 5 | 2 | | | 3 | 4 | 2 | 2 | 3 | | | | 4 | | 2 | 1 | | 1 | 3 |
| 22:00:00 | | 1 | | 1 | | | | 1 | | | | | | | 3 | | | | | | | |
| 23:00:00 | | | | | | | | | | | | | | | | | | | | | | |

| | TERMINAL DEVICE ID :002 | | |
|---|---|---|---|
| RECORD NO. | CALL ORIGINATION TIME | RECEPTION TIME | CALL ORIGINATION ASSISTANCE STATUS |
| 025 | 11:10:14 | | 0 |
| 026 | 11:40:15 | | 0 |
| 027 | 12:20:25 | | 0 |
| 028 | 12:45:24 | | 1 |
| 029 | 12:48:30 | | 1 |
| 030 | 12:51:23 | | 1 |

FIG.11B

| | TERMINAL DEVICE ID :003 | | |
|---|---|---|---|
| RECORD NO. | CALL ORIGINATION TIME | RECEPTION TIME | CALL ORIGINATION ASSISTANCE STATUS |
| 021 | 11:11:51 | | 1 |
| 022 | | 11:21:23 | 0 |
| 023 | 12:20:25 | | 0 |
| 024 | | 12:46:10 | 0 |
| 025 | 12:48:30 | | 0 |
| 026 | | 12:49:10 | 0 |

FIG.11C

| | TERMINAL DEVICE ID :004 | | |
|---|---|---|---|
| RECORD NO. | CALL ORIGINATION TIME | RECEPTION TIME | CALL ORIGINATION ASSISTANCE STATUS |
| 015 | 11:45:23 | | 0 |
| 016 | 12:10:13 | | 0 |
| 017 | 12:20:25 | | 1 |
| 018 | 12:45:24 | | 1 |
| 019 | 12:48:30 | | 1 |
| 020 | 12:57:24 | | 1 |

FIG.11D

| | TERMINAL DEVICE ID :005 | | |
|---|---|---|---|
| RECORD NO. | CALL ORIGINATION TIME | RECEPTION TIME | CALL ORIGINATION ASSISTANCE STATUS |
| 023 | 11:25:45 | | 0 |
| 024 | 11:26:50 | | 1 |
| 025 | 12:30:20 | | 1 |
| 026 | | 12:45:24 | 0 |
| 027 | 12:46:10 | | 0 |
| 028 | 12:52:23 | | 0 |

FIG.12

| TERMINAL DEVICE | ID | CALL ORIGINATION STATUS | LATEST COMMUNICATION TIME |
|---|---|---|---|
| SECOND TERMINAL DEVICE | 002 | RBT | 12:51:23 |
| THIRD TERMINAL DEVICE | 003 | NORMAL | 12:49:10 |
| FOURTH TERMINAL DEVICE | 004 | RBT | 12:57:24 |
| FIFTH TERMINAL DEVICE | 005 | NORMAL | 12:52:23 |
| .... | .... | .... | .... |
| NTH TERMINAL DEVICE | 024 | RBT | 12:46:11 |

| SECOND COUNTER | THIRD COUNTER | FOURTH COUNTER | FIFTH COUNTER |
|---|---|---|---|
| 1 | 3 | 2 | 0 |

| TERMINAL DEVICE | ID | LATEST COMMUNICATION TIME |
|---|---|---|
| FIRST TERMINAL DEVICE | 001 | 11:25:45 |
| SECOND TERMINAL DEVICE | 002 | 11:26:50 |
| THIRD TERMINAL DEVICE | 003 | 11:28:20 |
| FOURTH TERMINAL DEVICE | 004 | 11:10:20 |
| FIFTH TERMINAL DEVICE | 005 | 11:20:32 |
| .... | .... | .... |
| NTH TERMINAL DEVICE | 024 | 11:20:32 |
| .... | .... | .... |

12

TERMINAL DEVICE AND RECORDING MEDIUM FOR ORIGINATING SIGNALS

CROSS-REFERENCE TO RELATED APPLICATION

This application is based upon and claims the benefit of priority from the prior Japanese Patent Application No. 2018-189846, filed on Oct. 5, 2018, the entire contents of which is incorporated herein by reference.

BACKGROUND OF THE INVENTION

1. Field

The present invention relates to communication technologies and, more particularly, to a terminal device and a recording medium for originating signals.

2. Description of the Related Art

Systems in which a relay device relays communication between a wireless communication device and a telephone set via a network are proposed. In these systems, the relay device responds to a call from a telephone set on the condition that a response instruction is properly given from a portable handset, which is a wireless communication device. The relay device creates a branch to a talk mode in the case of an isolated incoming call, to a wireless call mode in the case of broadcasting, and to a session initiation protocol call origination mode in the case of a call originated from a wireless communication device.
[patent literature 1] JP2011-135290

A communication system comprised of a plurality of terminal devices may support a plurality of communication modes in some cases. For example, communication is started after a certain user operation is performed in a terminal device receiving a call signal in the first communication mode, and communication is started even when a certain user operation is not performed in a terminal device receiving a call signal. In the first communication mode, communication is started after the called user performs a certain user operation. Therefore, communication is not started without the user's knowledge, and the user can properly know the occurrence of communication. In the second communication mode, on the other hand, communication is started even when a certain user operation is not performed so that communication can be started promptly. Thus, the plurality of different communication modes have different characteristics and benefits and so it is desired to use the plurality of communication modes appropriately. In the related art, however, sufficient consideration has not been given to appropriate use of the plurality of communication modes.

SUMMARY OF THE INVENTION

A terminal device according to one embodiment includes: an acquisition unit that acquires a reference time that is a reception time when a signal was received from another terminal or a call origination time when the other terminal device transmitted a signal; a storage that stores a call origination time when the terminal device transmitted a signal to the other terminal device; a controller that selects, by referring to the reference time acquired by the acquisition unit and the call origination time stored in the storage, a first communication mode in which communication is started after a predetermined user operation is performed in the other terminal device or a second communication mode in which communication is started even when the predetermined user operation is not performed in the other terminal device; and a communication unit that transmits a signal to the other terminal device in accordance with the communication mode selected by the controller.

Another embodiment also relates to a terminal device. The terminal device includes: a storage that stores the number of times a signal was transmitted to another terminal device since a time when a signal was received from another terminal device; a controller that refers to the number of times stored in the storage to select a first communication mode in which communication is started after a predetermined user operation is performed in the other terminal device or a second communication mode in which communication is started even when the predetermined user operation is not performed in the other terminal device; and a communication unit that transmits a signal to the other terminal device in accordance with the communication mode selected by the controller.

Optional combinations of the aforementioned constituting elements, and implementations of the embodiments in the form of methods, apparatuses, systems, recording mediums, and computer programs may also be practiced as additional modes of the embodiments.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 7 shows a data structure of the record table in the terminal device;

FIG. 10 shows a data structure of the table stored in the storage unit of the terminal device according to embodiment 2;

FIGS. 11A, 11B, 11C, and 11D show a data structure of the record table according to embodiment 3;

FIG. 12 shows a screen displayed in the display unit of the terminal device according to embodiment 3;

FIG. 13 shows a data structure of the table showing the values of the counters maintained in the control unit of the terminal device according to embodiment 4; and FIG. 14 shows a data structure of the table stored in the management device according to embodiment 5.

DETAILED DESCRIPTION OF THE PREFERRED EMBODIMENT

The invention will now be described by reference to the preferred embodiments. This does not intend to limit the scope of the present invention, but to exemplify the invention.

Embodiment 1

Figure 1:
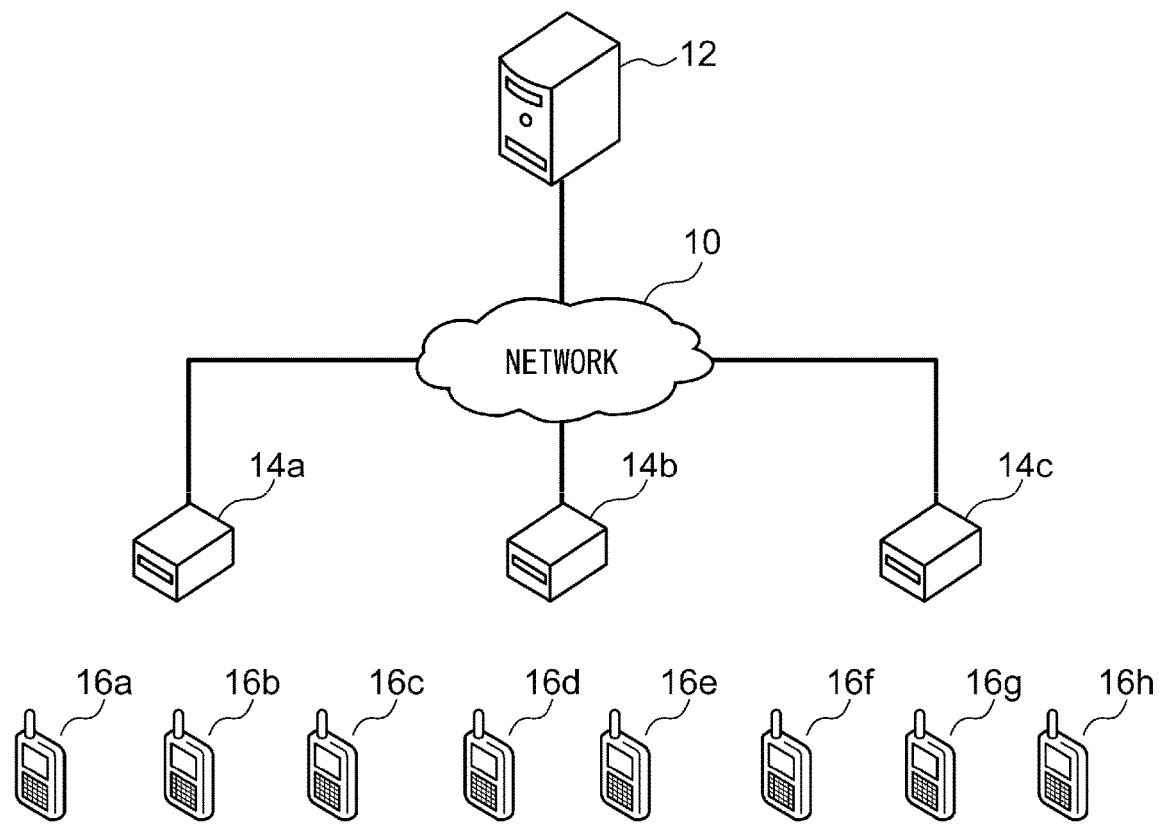
FIG. 1 shows a configuration of a communication system according to embodiment 1.

FIG. 1 shows a configuration of a communication system 100. The communication system 100 includes a network 10, a management device 12, a first base station device 14a, a second base station device 14b, a third base station device 14c, which are generically referred to as base station devices 14, and a first terminal device 16a, . . . , an eighth terminal device 16h, which are generically referred to as terminal devices 16. The number of base station devices 14 included in the communication system 100 is not limited to "3", and the number of terminal devices 16 is not limited to "8". There can be more or fewer base station devices or terminal devices.

The terminal device 16 is called an IP transceiver or a push-to-talk over cellular transceiver and performs voice communication. Voice communication is performed in the push-to-talk scheme, in which individual calls, group calls, simultaneous calls, and neighbor calls are possible. To perform such voice communication, the terminal device 16 is connected to the base station device 14. The half-duplex or full-duplex communication scheme is used as a communication scheme for communication between the base station device 14 and the terminal device 16.

The plurality of base station devices 14 are mutually connected by the network 10. The network 10 is, for example, an Internet protocol network. The management device 12 is connected to the network 10. The management device 12 is comprised of, for example, a session initiation protocol server and performs an SIP sequence process for talks between the terminal devices 16.

In this configuration, the user holds the talk button of the terminal device 16 down to make a voice call with another user using another terminal device 16. Over a period of time during which the user of one of the plurality of terminal devices 16 involved in a given voice call is holding the talk button down and making a call, the other users cannot make a call even if they push the talk button, in the case the communication scheme is a half-duplex communication scheme. Operations initiated when the talk button is held down to start a talk include normal call origination and ring back tone (hereinafter, "RBT") call origination.

Figure 2A:
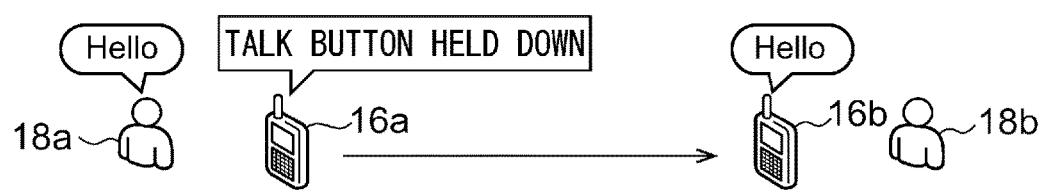
FIGS. 2A and 2B show a summary of normal call origination in the communication system of FIG. 1.
Figure 2B:
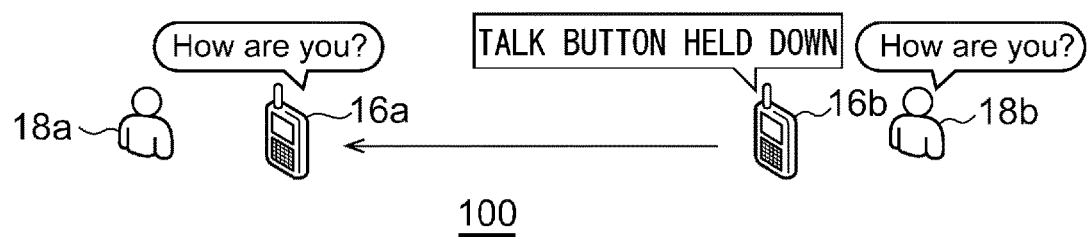

FIGS. 2A-2B show a summary of normal call origination in the communication system 100. Communication between two terminal devices 16 including the first terminal device 16a and the second terminal device 16b is assumed. Communication may take place between three or more terminal devices 16 or may be one-to-many group communication. The first terminal device 16a is used by a first user 18a, and the second terminal device 16b is used by a second user 18b. It is assumed that half-duplex communication is used.

Referring to FIG. 2A, a voice call between the first user 18a and the second user 18b is maintained while first user 18a is holding the talk button of the first terminal device 16a down, even if the second user 18b does not perform any user operation in the second terminal device 16b. To describe it more specifically, the voice originated by the first user 18a is transmitted in the form of a voice signal from the first terminal device 16a to the second terminal device 16b, while the first user 18a is holding the talk button of the first terminal device 16a down. The second terminal device 16b reproduces the received voice signal and outputs the voice. FIG. 2B shows a process that follows the process of FIG. 2A. The voice originated by the second user 18b is transmitted in the form of a voice signal from the second terminal device 16b to the first terminal device 16a, while the second user 18b is holding the talk button of the second terminal device 16b down. The first terminal device 16a reproduces the received voice signal and outputs the voice. In this way, the first user 18a and the second user 18b alternately holds the talk button down to talk.

Figure 3A:
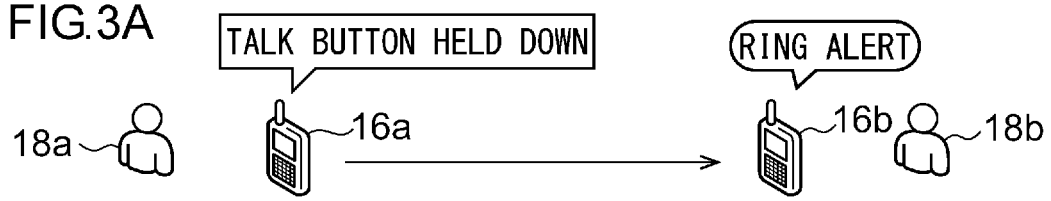
FIGS. 3A, 3B, 3C, and 3D show a summary of RBT call origination in the communication system of FIG. 1.
Figure 3B:
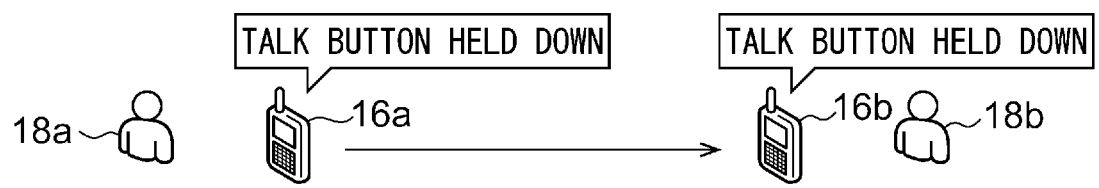
Figure 3C:
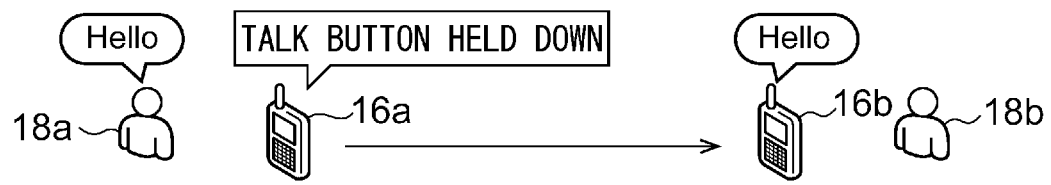
Figure 3D:
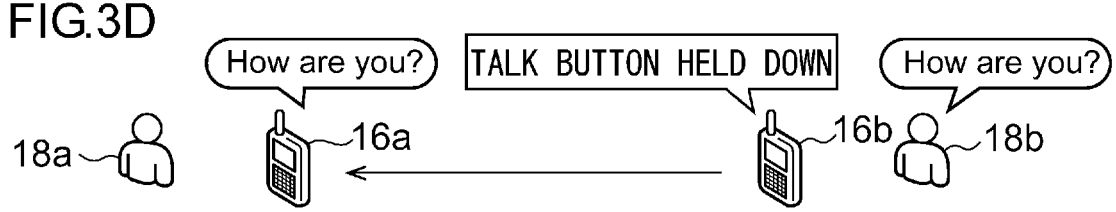

FIGS. 3A-3D show a summary of RBT call origination in the communication system 100. FIGS. 3A-3D are similar to FIGS. 2A-2B. While the first user 18a is holding the talk button of the first terminal device 16a down, the first terminal device 16a outputs a ring-back tone. The second terminal device 16b does not start a voice call and outputs a ring alert. FIG. 3B shows a process that follows the process of FIG. 3A. When the second user 18b hearing the ring alert holds the talk button of the second terminal device 16b down, a transition to the status of communication shown in FIG. 3C is made. When the first user 18a stops holding the talk button of the first terminal device 16a down (releases the talk button), the status of communication shown in FIG. 3C is terminated. When the second user 18b holds the talk button of the second terminal device 16b down within a predetermined period of time since the termination of the talk, a return talk (call back) from the second terminal device 16b to the first terminal device 16a is started. This status is shown in FIG. 3D. In a return call in response to an RBT call origination, the ring-back tone of the second terminal device 16b or the ring alert of the first terminal device 16a are not output, and the devices are immediately placed in a status of communication. When the second user 18b holds the talk button of the second terminal device 16b down after an elapse of the predetermined period of time since the termination of the talk of FIG. 3C, a new RBT call origination instead of a return talk is initiated. In this case, the ring-back tone of the second terminal device 16b and the ring alert of the first terminal device 16a are output. As described above, RBT call origination requires a user operation in the receiving (called) terminal device 16 to start a voice call. Therefore, RBT call origination is used when it is necessary to communicate information to the destination of call properly. In the description given above, it is assumed that RBT call origination is performed by a user operation of keep holding the talk button down. RBT call origination may be performed by an alternative user operation. For example, RBT call origination may be performed by holding the talk button down once for a short period of time.

Switching between normal call origination and RBT call origination is generally performed based on the setting in the calling terminal device 16. When "normal call origination" is set in the terminal device 16, or when "normal call origination or RBT call origination to originate a call" is set and "normal call origination" is selected to originate a call, normal call origination is performed. As described above, a talk is started in the operation for normal call origination without manipulating the talk button in the receiving terminal device 16. For this reason, the originated information will be all wasted if the user using the receiving terminal device 16 is not near the terminal device 16 because the user has left his or her seat or if the user is taking a sleep. Further, if normal call origination is performed variably because the user does not fully understand the specification or user operation method of the terminal device 16 or because of a mistaken setting, the call might be missed at the receiving end even when it is necessary to communicate the information to the recipient user properly. RBT call origination is advantageous in that the information is properly communicated to the recipient user but is also disadvantageous in that the user operation of the user 18 will be complicated. For this reason, the convenience for the user 18 may be impaired if RBT call origination is invariably set. This embodiment is directed to the purpose of using normal call origination and RBT call origination appropriately.

Figure 4:
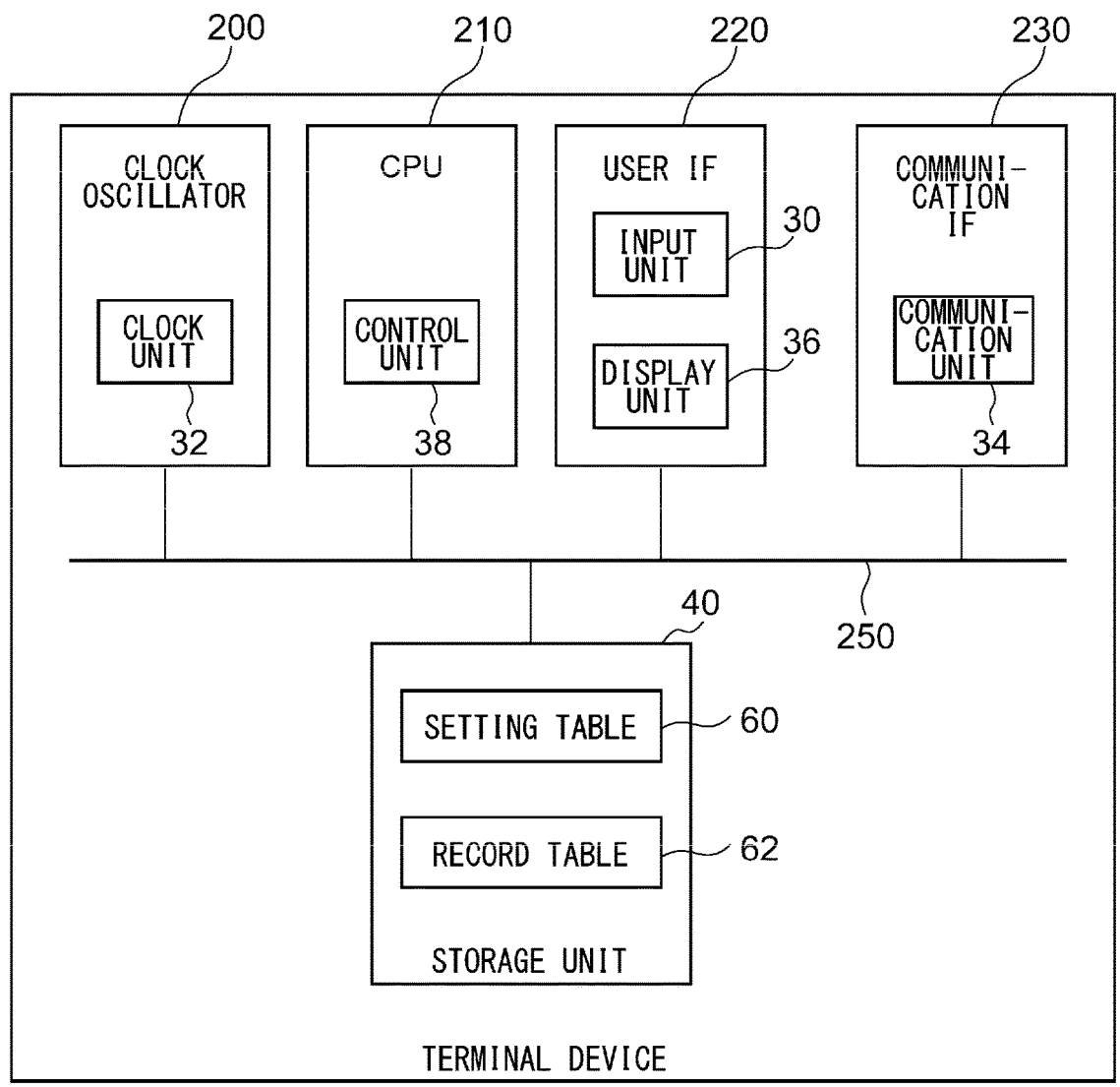
FIG. 4 shows a hardware configuration and functional blocks of the terminal device.

FIG. 4 shows a hardware configuration and functional blocks of the terminal device 16. The terminal device 16 includes a clock oscillator 200, a central processing unit (CPU) 210, a user interface (IF) 220, a communication IF 230, and a storage unit 40. The clock oscillator 200, the CPU 210, the user IF 220, the communication IF 230, and the storage unit 40 are connected by a bus 250.

The clock oscillator 200 is, for example, a crystal oscillator and generates a signal of a predetermined frequency. The CPU 210 performs a process in the terminal device 16. The user IF 220 is an interface for the user 18. The user IF 220 receives information from the user 18 or presents information to the user 18. The communication IF 230 is connected to the network 10 and communicates with the base station device 14. The communication IF 230 also communicates with the management device 12 via the base station device 14. The storage unit 40 is a medium for storing information and is, for example, a hard disk or a solid-state drive (SSD).

The clock oscillator 200 includes clock unit 32, the CPU 210 includes a control unit 38, and the user IF 220 includes an input unit 30 and a display unit 36, and the communication IF 230 includes a communication unit 34. The storage unit 40 includes a setting table 60 and a record table 62.

Figure 5:
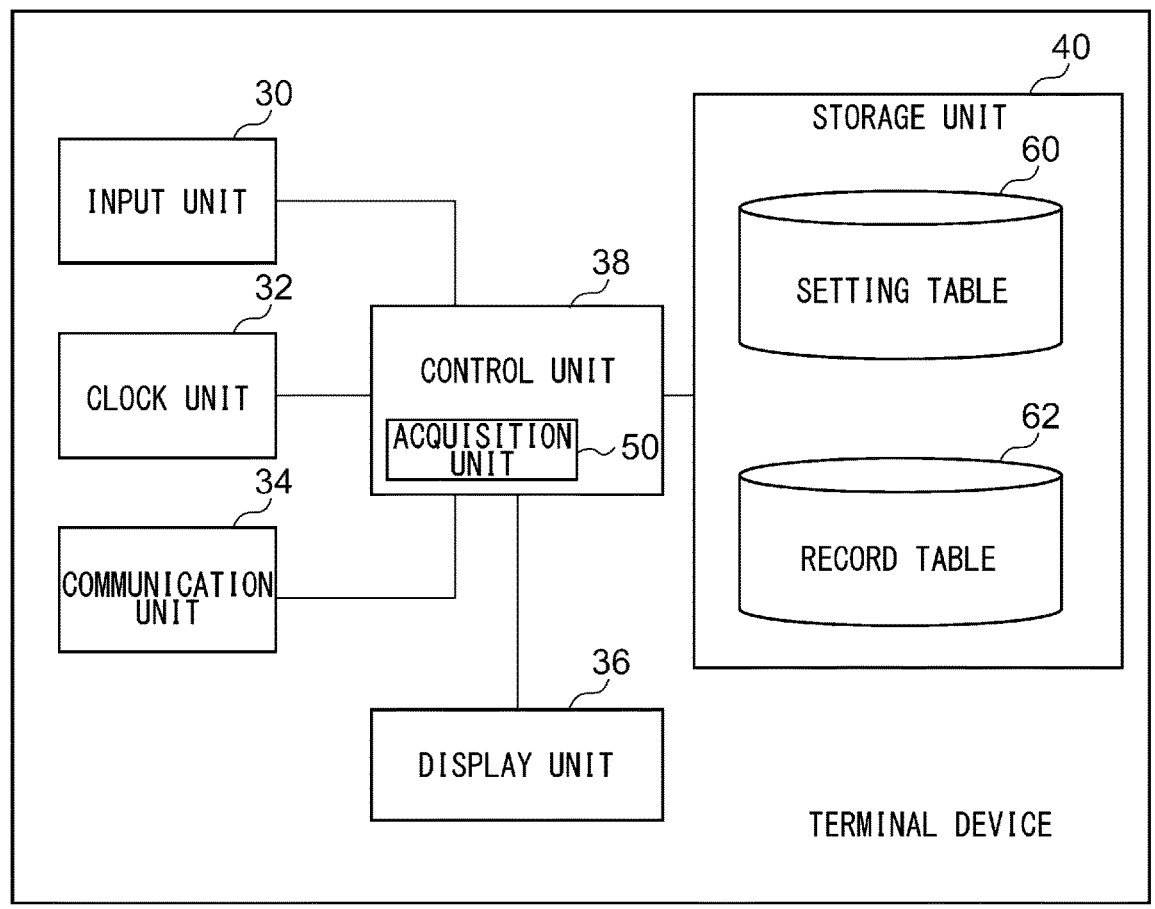
FIG. 5 shows detailed functional blocks of the terminal device.

FIG. 5 shows detailed functional blocks of the terminal device 16. The terminal device 16 includes the input unit 30, the clock unit 32, the communication unit 34, the display unit 36, the control unit 38, and the storage unit 40. The control unit 38 includes an acquisition unit 50, and the storage unit 40 includes the setting table 60 and the record table 62. The input unit 30 includes buttons manipulated by the user 18 of the terminal device 16, an input device such as a touch-sensitive panel, and an interface for notifying the control unit 38 of the status of the input device. The input unit 30 includes a talk button held down to originate a call. The status of the talk button held down is detected in the input unit 30 and input to the control unit 38.

The display unit 36 is an interface for displaying the setting and talk status of the terminal device 16 and is, for example, a display. Various setting information related to the terminal device 16 is recorded in the setting table 60. For example, information related to RBT usage setting (RBT setting information) is recorded in the setting table 60. More specifically, information indicating which of "do not use", "always use", "select when making a call" (e.g., the values 0, 1, 2) is selected by the user is recorded in the RBT usage setting.

Figure 6A:
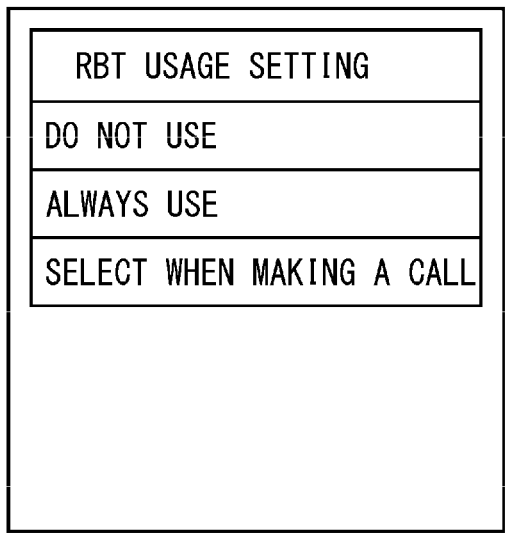
FIGS. 6A and 6B show screens displayed in the display unit of the terminal device.
Figure 6B:
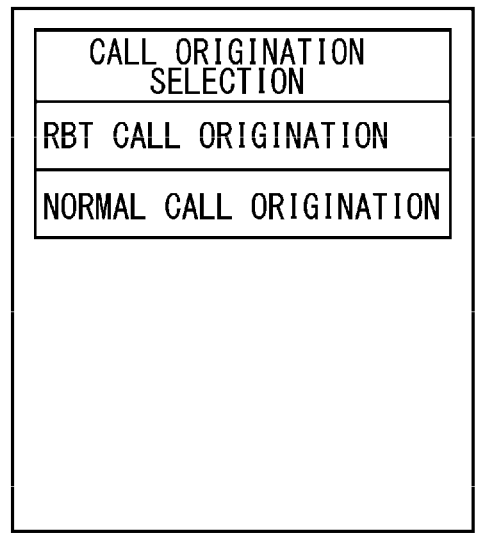

FIGS. 6A-6B show screens displayed in the display unit 36. These are examples of screen views for providing the setting related to normal call origination and RBT call origination in the terminal device 16. The operation performed when originating a call is set by using the RBT usage setting screen of FIG. 6A. The setting is recorded in the setting table 60. In the case "do not use" is set, normal call origination is performed after the talk button is held down. In the case "always use" is set, RBT call origination is performed after the talk button is held down. In the case "select when originating a call" is set, a call origination selection screen of FIG. 6B is displayed after the talk button is held down. In other words, the user 18 selects normal call origination or RBT call origination every time the user start a talk (for each session of call origination). In the case "RBT call origination" is selected in the call origination selection screen of FIG. 6B, RBT call origination is performed. In the case "normal call origination" is selected, normal call origination is performed. Reference is made back to FIG. 5.

In the case the talk button is manipulated and is detected as being held down in the input unit 30, the control unit 38 directs the communication unit 34 to perform normal call origination or RBT call origination by referring to the RBT setting information in the setting table 60. In this process, the control unit 38 acquires the current time from the clock unit 32 and appends the current time acquired to the record table 62 as the call origination time. In this way, the terminal device stores the call origination time in the record table 62 when the terminal device transmitted a signal (call signal) to another terminal device 16. Further, when reception from a call originator is detected in the communication unit 34, the current time is acquired from the clock unit 32. The current time can be said to be the reception time when a signal (call signal) is received from another terminal device 16. The control unit 38 appends the reception time to the record table 62. In this way, the record table 62 stores a record of originating a call to the destination from the terminal device 16 and a record of reception from the call originator. The communication unit 34 performs normal call origination, RBT call origination, and voice call in accordance with an instruction from the control unit 38. A publicly known technology may be used for these processes so that a description thereof is omitted.

FIG. 7 shows a data structure of the record table 62. The figure shows the record table 62 stored in the first terminal device 16a by way of example. The record table 62 stores information related to communication in which the first terminal device 16a called the second terminal device 16b and communication in which the first terminal device 16a was called by the second terminal device 16b (communication in which the second terminal device 16b called the first terminal device 16a). "Record No." (record number) is a number for identifying the record information. The smaller the value of the record No., the older the record information, and the larger the value, the newer the record information. The time when the first terminal device 16a called the destination second terminal device 16b is entered in the "call origination time" field, and the time when the first terminal device 16a was called by the second terminal device 16b is entered in the "reception time" field. An exemplary entry in the reception time field "10:10:11" means "10 minutes 11 seconds past 10 o'clock". The result of determination in the RBT call origination assistance determination process made when a call is originated and described later is recorded in the "call origination assistance status" field. When a determination of YES to RBT call origination assistance is made in the RBT call origination assistance determination process, "1" is recorded in the field. When a determination of NO to RBT call origination assistance is made in the RBT call origination assistance determination process, "0" is recorded in the field. When the reception time indicating the time of reception from the second terminal device 16b is appended, "0" is invariably recorded as the call origination assistance status.

The record table 62 is capable of storing a certain number of (e.g., 30) records. When new time information is appended in a state in which the number of records has reached the upper limit, old record information is deleted sequentially. In the example of FIG. 7, when the terminal device 16 originates or receives a call after the time "13:24:34" of the No. 030 record, which represents the certain number, the record of the record No. 001 indicating the call origination time "10:10:11" is deleted. Further, when an old record is deleted, the record information is adjusted such that the older the record information, the smaller the value of the record No. of the record information. In the above example, the record No. of the record information appended after "13:24:34" is recorded with No. 030. The record information "13:24:34" hitherto recorded with the record No. 030 is adjusted to have the record No. 029. When the record of the record No. 001 indicating the call origination time "10:10:11" is deleted, the record No. of the record information of No. 002 indicating the call origination time "10:11:00" is adjusted to No. 001. Thus, in the example of FIG. 7, the record No. of the oldest record information is always No. 001 and the record No. of the newest record information is always No. 0030, even when an old record is deleted, and a new record is added. In the example shown in FIG. 7, only the time is recorded to indicate the call origination time and the reception time, but the date (year, month, date) may be additionally recorded. In other words, the date and time of call origination and reception may be recorded. Further, the call origination time and the reception time are recorded in different fields in the table. Alternatively, the time or the date and time may be recorded in a single field such as "event time". In that case, information discriminating between reception and call origination is recorded in a field such as "event type". Still alternatively, a table storing call origination information and a table storing reception information may be isolated. Reference is made back to FIG. 5.

When the input unit 30 detects that the talk button is held down, the control unit 38 acquires the current time from the clock unit 32. Subsequently, the control unit 38 refers to the record table 62 and checks the call origination assistance status in the record information in which the latest call origination time is recorded (the latest call origination information). In the example of FIG. 7, the record in which the latest call origination time is recorded is the record with the record No. 028. In the case the call origination assistance status is "0", the control unit 38 makes a transition to the RBT call origination assistance determination process described later. In the case the call origination assistance status is "1", on the other hand, the control unit 38 immediately directs the communication unit 34 to perform RBT call origination. Subsequently, the control unit 38 appends, to the record table 62, record information designating the current time as the call origination time and designating the call origination assistance status of "1". Cases in which the RBT call origination assistance status in the most recent (previous) call origination is identified to be "1" when the talk button is held down include, in the example of FIG. 7, "11:02:27" of the record No. 016, "11:05:31" of the record No. 017, "12:48:30" of the record No. 023, and "12:51:23" of the record No. 024.

A description will now be given of the detail of the RBT call origination assistance determination process. The control unit 38 searches the record table 62 for a record in which the reception time closest to the current time is recorded (the latest reception record). The value of the record No. identified in this step is indicated by "NR". In the case there are no records of the reception time, NR is set to be "000". Of those call origination records having a value of the record No larger than NR, the control unit 38 searches for a call origination record of the call origination time up to the current time and counts the number of call origination records. In other words, the control unit 38 counts the number of call origination records newer than the latest reception record. The number of call origination records counted here can be said to be the number of occurrences of call origination time later than the latest reception time. The number can also be said to be the number of times that calls were originated later than the latest reception time. In order to originate a call, it is necessary for the user 18 to manipulate the terminal device 16 actively. It is therefore possible to estimate that the second user 18b of the second terminal device 16b was near the second terminal device 16b and was active (not in sleep) at the time of the record "NR".

In this embodiment, the status in which the user 18 can know the detail of communication (e.g., the status in which the user 18 is not asleep or is not occupied by an activity other than communication) will be referred to as "active status". The number of call origination records counted here represents the number of times that the first terminal device 16a originated a call after the last time when the partner second user 18b was identified to be active near the second terminal device 16b. In the case the numerical value of the count of call origination records is less than a threshold value (e.g., 3), the control unit 38 determines not to use RBT call origination assistance (NO to RBT call origination assistance) in the current call origination. After the RBT call origination assistance determination process, the control unit 38 directs the communication unit 34 to perform normal call origination. Subsequently, the control unit 38 appends, to the record table 62, information designating the current time as the call origination time and designating the RBT call origination assistance status of "0".

In the case the numerical value of the count of call origination records is equal to or larger than a threshold value (e.g., 3), on the other hand, the control unit 38 determines to use RBT call origination assistance (YES to RBT call origination assistance) in the current call origination. After the RBT call origination assistance determination process, the control unit 38 directs the communication unit 34 to perform RBT call origination. Subsequently, the control unit 38 appends, to the record table 62, information designating the current time as the call origination time and designating the call origination assistance status of "1". The process is based on an observation that it is unnatural for the second terminal device 16b not to originate a call a single time regardless of the fact that the first terminal device 16a called more than the number of times defined by the threshold value and that it is estimated that the second user 18b of the second terminal device 16b is not near the second terminal device 16b or not active. In other words, the control unit 38 counts the number of records of call origination time later than the most recent reception time. In the case the number counted is equal to larger than the threshold value, the control unit 38 selects RBT call origination. In the case the number counted is smaller than the threshold value, the control unit 38 selects normal call origination. Referring to RBT call origination as the first communication mode, normal call origination will be referred to as the second communication mode.

The process will be described in specific detail with reference to the example of FIG. 7. In the following description, it is assumed that the threshold value of the number of records is "3". In the example of FIG. 7, the talk button is held down at "10:58:21", as indicated by the record No. 014. The most recent reception time is "10:35:05", and NR is "011". Of the records with a record No. having a value larger than NR, the records in which the call origination time up to the current time "10:58:21" are recorded are two records, namely, "10:41:14" of the record No. 012 and "10:47:21" of the record No. 013. Since the number of counted records "2" is less than the threshold value "3", the control unit 38 determines NO to RBT call origination assistance.

When the talk button is subsequently held down at "11:00:00" of the record No. 015, the most recent reception time is "10:35:05", as in the case of the record No. 014, and NR is "011". Of the records newer than NR, those in which the call origination time up to the current time "11:00:00" is recorded include three records, namely, "10:41:14" of the record No. 012, "10:47:21" of the record No. 013, and "10:58:21" of the record No. 014. Since the number of counted records "3" is equal to or larger than the threshold value "3", the control unit 38 determines YES to RBT call origination assistance.

In other words, in the case a call is not returned from the second user 18b (the first user 18a is not called) regardless of the fact that the first user 18a originated a call a certain number of times, it is determined that the call origination information may not be communicated to the second user 18b and RBT call origination assistance is offered. In the example of FIG. 7, the records for which a determination of YES to RBT call origination assistance is made in the RBT call origination assistance determination process include "11:00:00" of the record No. 015 and "12:45:24" of the record No. 022. These points of time can be said to be when a new determination is made that the call origination information is not communicated to the second user 18b and the call origination assistance status changed from "0" to "1".

In this way, the control unit 38 selects either RBT call origination or normal call origination by referring to the call origination time and the reception time stored in the storage unit 40. RBT call origination is a communication mode in which communication is started when a certain user operation is made in another terminal device 16. Normal call origination is a communication mode in which communication is started even when a certain user operation is not performed in another terminal device 16. The communication unit 34 transmits a call signal to the other terminal device 16 in accordance with the communication mode selected by the control unit 38.

The terminal device 16 described above is implemented in hardware such as a CPU, a memory, or other LSI's of an arbitrary computer, and in software such as a program loaded into a memory, etc. The figure depicts functional blocks implemented by the coordination of these elements. The terminal device 16 may be implemented as a program for performing a distributed process by using a plurality of computers. For example, a plurality of computers may be caused to process different functions so that a desired processing result is obtained in a computer system as a whole. Therefore, it will be understood by those skilled in the art that the functional blocks may be implemented in a variety of manners by hardware only or by a combination of hardware and software.

Figure 8:
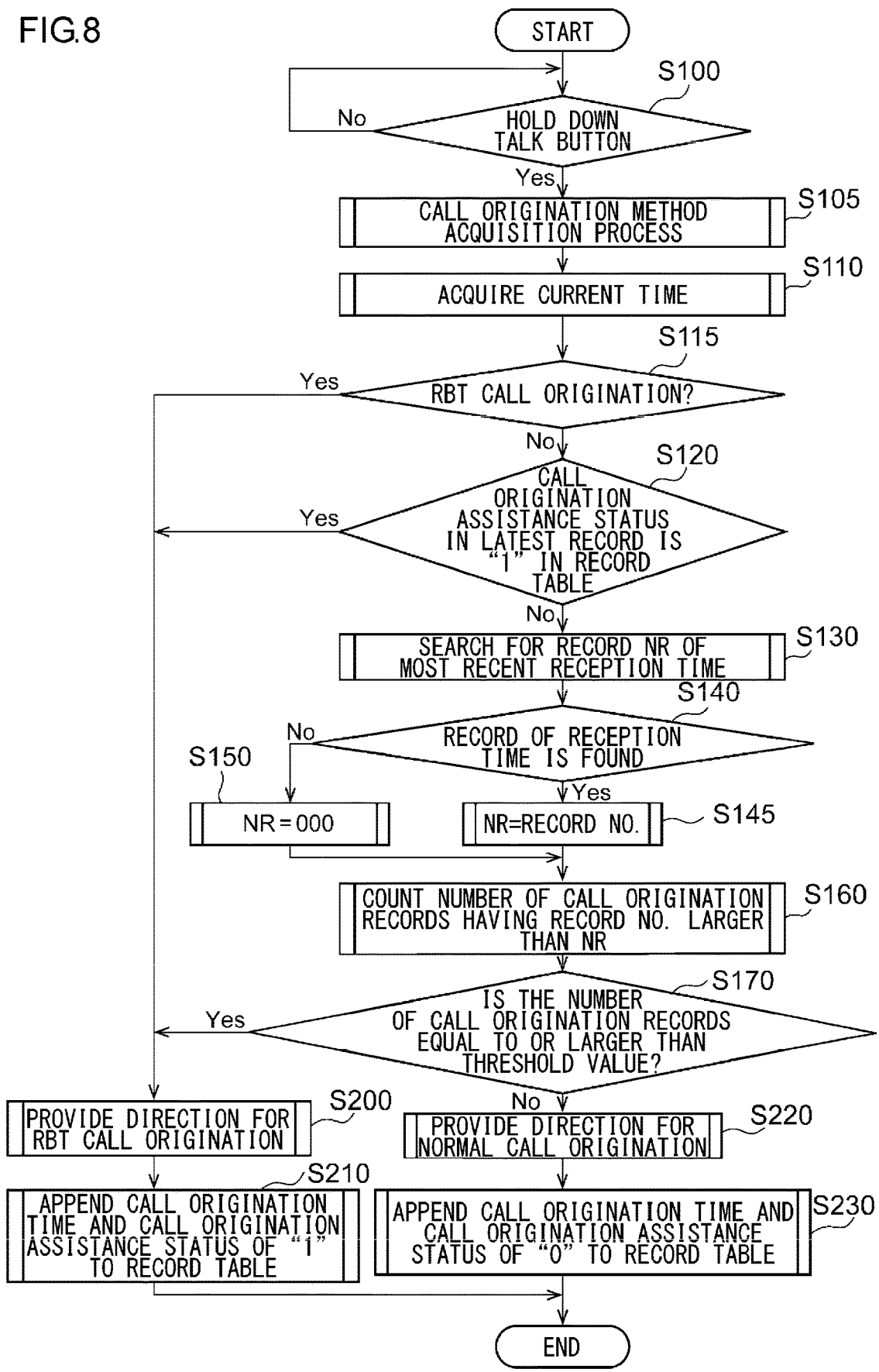
FIG. 8 is a flowchart showing a communication mode selection process performed by the terminal device.

FIG. 8 is a flowchart showing a communication mode selection process (call origination procedure) performed by the terminal device 16. The control unit 38 monitors whether the talk button is detected as being held down in the input unit 30 (S100). When the talk button is not detected as being held down (S100: No), control is returned to S100, and the step is repeated. When the talk button is detected as being held down (S100: Yes), the control unit 38 proceeds to S105. In S105, the control unit 38 performs a call origination method acquisition process. The detail of the call origination method acquisition process will be discussed in detail later. The control unit 38 acquires a variable SX indicating the call origination method. After the call origination method acquisition process in S105, the control unit 38 proceeds to S110. In S110, the control unit 38 (the acquisition unit 50) acquires the current time from the clock unit 32 and then proceeds to S115. In S115, the control unit 38 checks the variable SX acquired in S105. In the case the call origination method is "RBT call origination" (S115: Yes), the control unit 38 proceeds to S200. In the case the call origination method is "normal call origination" (S115: No), the control unit 38 proceeds to S120. In S120, the control unit 38 checks the call origination assistance status in the latest call origination record in the record table 62. In the case the call origination assistance status is "1" (S120: Yes), the control unit 38 proceeds to S200. In the case the call origination assistance status is "0" (S120: No), the control unit 38 proceeds to S130.

In S130, the control unit 38 searches the record table 62 for a reception record in which the reception time closest to the current time (the latest reception time) is recorded. The control unit 38 then proceeds to S140. In S140, the control unit 38 determines whether a reception record is acquired in the search in S130. In the case a reception record is found (S140: Yes), the control unit 38 proceeds to S145. In the case a reception record is not found (S140: No), the control unit 38 proceeds to S150. In S145, the control unit 38 sets the record No. of the reception record acquired in S130 in the variable NR. The control unit 38 then proceeds to S160. In S150, the control unit 38 has not retrieved any reception record and so sets the variable NR to "000" and then proceeds to S160. In S160, of those records having a value of the record No larger than NR, the control unit 38 counts the number of records (call origination records) in which the call origination time up to the current time is recorded. The control unit 38 then proceeds to S170.

In S170, the control unit 38 determines whether the number of call origination records counted in S160 is equal or larger than a threshold value. In the case the number of call origination records is equal or larger than the threshold value, the control unit 38 makes a transition to S200. In the case the number of call origination records is less than the threshold value, the control unit 38 makes a transition to S220. In S200, the control unit 38 directs the communication unit 34 to perform RBT call origination and then proceeds to S210. In S210, the control unit 38 appends, to the record table 62, information designating the call origination time and the call origination assistance status of "1". The control unit 38 then terminates the process. In S220, the control unit 38 directs the communication unit 34 to perform normal call origination and then proceeds to S230. In S230, the control unit 38 appends, to the record table 62, information designating the call origination time and the call origination assistance status of "0". The control unit 38 then terminates the process.

Figure 9:
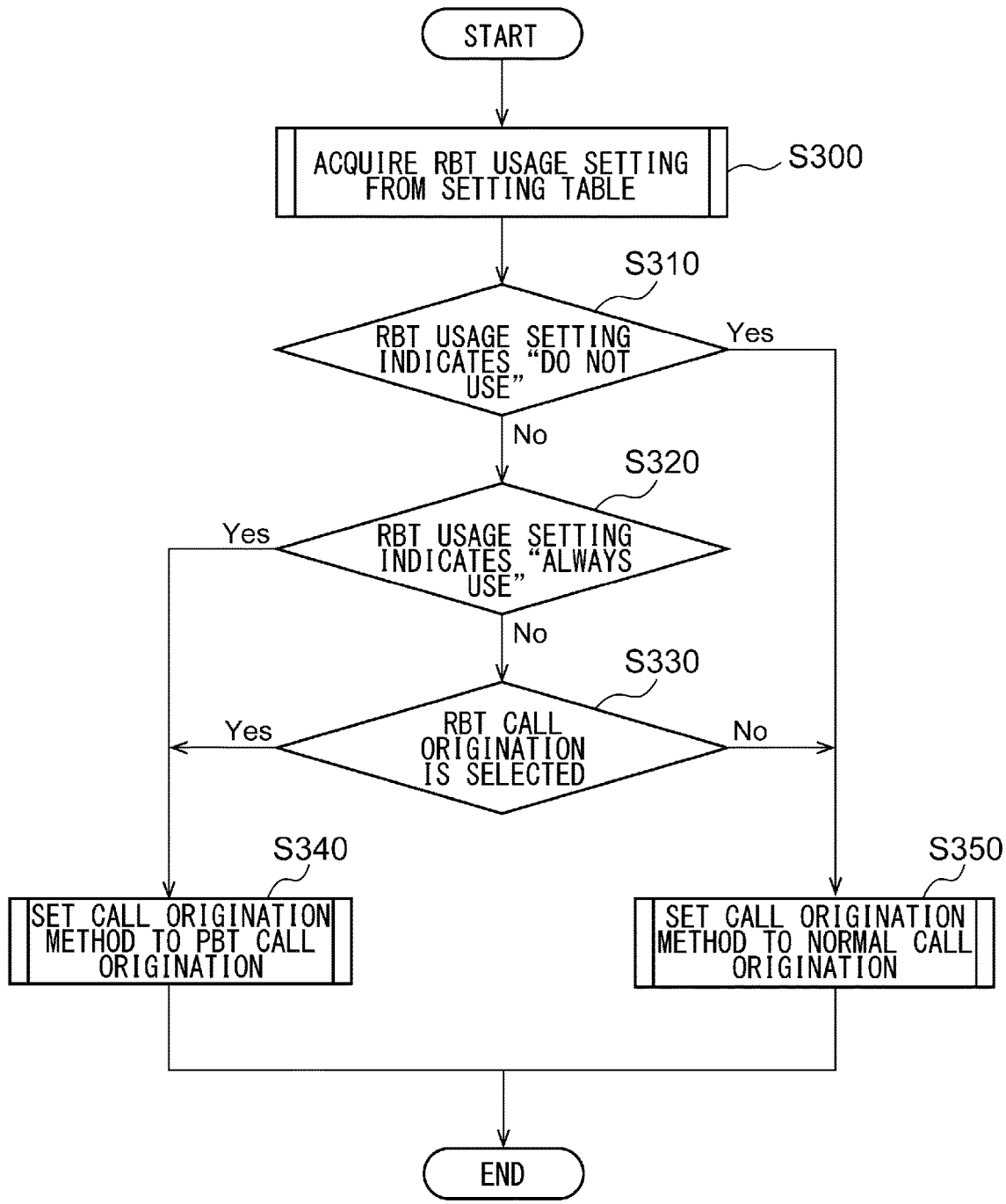
FIG. 9 is a flowchart showing the steps in the call origination method acquisition process performed by the terminal device.

FIG. 9 is a flowchart showing the steps in the call origination method acquisition process performed by the terminal device 16. The steps correspond to S105 of FIG. 8. In S300, the control unit 38 acquires the RBT usage setting from the setting table 60. The setting table 60 records data related to the usage of RBT selected by the user 18 (data indicating one of "do not use", "always use", "select when making a call"), and the control unit 38 acquires the data. The control unit 38 then proceeds to S310. In the case the RBT usage setting is found to indicate "do not use" in S310 (S310: Yes), the control unit 38 proceeds to S350. In the case the RBT usage setting is other than "do not use" (S310: No), the control proceeds to S320.

In the case the RBT usage setting is found to indicate "always use" in S320 (S320; Yes), the control unit 38 proceeds to S340. In the case the RBT usage setting is other than "always use" (S320: No), the control proceeds to S330. When control proceeds to S330, it means that "select when making a call" is selected. In S330, the control unit 38 causes the display unit 36 to display the call origination selection screen shown in FIG. 6B. The control unit 38 acquires the data indicating "RBT call origination" or "normal call origination" selected by the user 18 via the input unit 30. The control unit 38 determines whether "RBT call origination" is selected in the call origination selection screen. In the case "RBT call origination" is selected in the call origination screen (S330: Yes), the control unit 38 proceeds to S340. In the case an option other than "RBT call origination" is selected in the call origination selection screen, i.e., in the case "normal call origination" is selected in this embodiment (S330: No), the control unit 38 proceeds to S350. In S340, the control unit 38 sets "RBT call origination" in the variable SX indicating the call origination method, returns the variable SX, and terminates the process. In S350, the control unit 38 sets "normal call origination" in the variable SX indicating the call origination method, returns the variable SX. and terminates the process.

In this embodiment, a determination as to whether to perform RBT call origination assistance is made in S170 in accordance with the number of call origination records that meet a predetermined condition. Alternatively, another method may be used for determination. For example, the reception time in the record acquired in step S130 may be used to perform the determination process of S170. More specifically, in the case the number of call origination records that meet the predetermined condition is equal to larger than the threshold value and the current time is a predetermined period of time or longer past the reception time of NR, a determination to perform RBT call origination assistance may be made. Alternatively, the determination process may be performed without using the number of call origination records, and a determination to perform RBT call origination assistance may be made when the current time is a predetermined period of time or longer past the reception time of NR.

In this embodiment, the communication system 100 for processing voice calls between the terminal devices 16 is illustrated in the description. Alternatively, communication other than voice calls may be processed. For example, the communication system 100 may process video calls using video and voice. Alternatively, text messages may be exchanged in the communication system 100. For example, a normal call origination mode and an RBT call origination mode (forced response mode) are defined in a chat system for exchanging text data or image data. In the case it is desired in the first terminal device 16a to transmit text data to the second terminal device 16b, the user 18 (the first user 18a) of the first terminal device 16a can input and transmit text data immediately in the normal call origination mode. The transmitted data is immediately displayed in the second terminal device 16b, but it is not guaranteed that the user 18 (the second user 18b) of the second terminal device 16b is recognizing it. In other words, the second user 18b may not recognize the existence of the text data (text message) immediately upon it is received and might recognize it much later than the reception time.

In the RBT call origination mode, on the other hand, the first terminal device 16a transmits a session start request to the second terminal device 16b. An alert sound, etc. indicating that there is a session start request is output in the second terminal device 16b. A session is established as the second user 18b performs a certain user operation to respond (accept) the session start request. Thereafter, the first user 18a can input a text. The first user 18a performs a user operation such as an input of a text immediately after the second user 18b responds. It is therefore more likely that the second user 18b recognizes the message immediately than in the normal call origination mode. This prevents the user operation of the user 18 from being wasted even in the case of sending a message that would be worthless if the recipient recognizes it when the time passes. It will be assumed, for example, that the first user 18a transmits a message "Let's meet at 12:30 and go to lunch together" to the second terminal device 16b at 11:50. In the case of normal call origination mode, the second terminal device 16b receives the message substantially instantly. However, the second user 18b may become aware of the message at, for example, 14:00. In that case, the user operation (effort) of the first user 18a related to message transmission will be wasted. The normal call origination mode is advantageous in that it is not necessary for the second user 18b to make a response operation, and that the time to start a call or transmit a message is short. However, the user operation of the first user 18a might be wasted. In the RBT call origination mode, on the other hand, the first user 18a creates and transmits a message after acknowledging a response from the second user 18b. Therefore, it is less likely that the user operation (effort) of the first user 18a related to message transmission will be wasted. Both of the terminal devices 16 may transmit data freely for a predetermined period of time after the user session is established. Alternatively, the system may operate to make it necessary for a user to wait for a response of the recipient before transmitting data. In this way, the user operation of the calling user 18 is advantageously prevented from being wasted due to absence or inactivity of the recipient.

In this embodiment, an example in which the communication mode selection process for selecting a mode for communication with the second terminal device 16b is performed in the first terminal device 16a is described for brevity. This should not be construed as limiting the embodiment to the situation in which the second terminal device 16b is the only communication partner of the first terminal device 16a. For example, the embodiment is also relevant to a situation where the first terminal device 16a is capable of communicating with a plurality of terminal devices 16 including the second terminal device 16b, and the first terminal device 16a performs the communication mode selection process for communication with the second terminal device 16b and does not perform the communication mode selection process for the other terminal devices.

According to this embodiment, either RBT call origination and normal call origination is selected by referring to the reception time when a signal is received from another terminal device and the call origination time when a signal is transmitted to another terminal device. Therefore, it is possible to make a selection adapted to the situation in the other terminal device. Further, it is possible to make a selection adapted to the situation in the other terminal device so that RBT call origination and normal call origination can be used appropriately. Further, the number of occurrences of call origination time later than the most recent reception time is counted, and, when the counted number is equal to or larger than the threshold value, RBT call origination is selected. Therefore, RBT call origination is selected when the communication partner is not in an active status. Further, RBT call origination is selected when the communication partner is not in an active status so that the likelihood of the calling user making a call or performing a user operation in vain is reduced.

Further, the number of occurrences of call origination time later than the most recent reception time is counted, and, when the counted number is smaller than the threshold value, normal call origination is selected. Therefore, normal call origination is selected when the communication partner is in an active status. Further, normal call origination is selected when the communication partner is in an active status. Therefore, the user operation of the recipient in an active state (the user at the receiving end) is simplified. Further, the user operation of the recipient in an active state is simplified so that the convenience is improved. Further, normal call origination is selected in the event of activity. Therefore, the time required to start a call or transmit a message is reduced as compared to the case of performing RBT call origination at any time. Further, the record related call origination and reception between terminal devices is maintained to make a determination, and either RBT call origination or normal call origination is selected. Therefore, the occurrence of wasted calls in the wireless communication system is reduced. The user operation of the user is prevented from becoming complicated and, at the same time, information can be properly communicated to the receiving end.

Embodiment 2

A description will now be given of embodiment 2. Like embodiment 1, embodiment 2 relates to a communication system including a plurality of terminal devices that communicate with each other via a base station device and is directed to the purpose of using normal call origination and RBT call origination appropriately. In embodiment 2, an RBT call generation assistance time table, in which the time when RBT call origination assistance occurred is aggregated over a long period of time, is created, and either RBT call origination or normal call origination is selected by referring to the RBT call origination assistance time table. The communication system 100 according to embodiment 2 is of the same as that of FIG. 1, and the terminal devices 16 are of the same type as those of FIGS. 4 and 5. The description below highlights a difference from embodiment 1.

FIG. 10 shows a data structure of the RBT call origination assistance time table stored in the storage unit 40. In the RBT call origination assistance time table shown in the figure, the number of occurrences of RBT call origination assistance in each time zone (an interval of 1 hour) in a 24-hour unit (from 00:00:00 to 23:59:59) is recorded. The record is kept over a predetermined period of time (e.g., 2 months). The row in the table represents a time zone of one hour, and the column of the table represents the date. The numeral entered in the cell represents the number of times that RBT call origination assistance was performed in the relevant time zone on the relevant date, and the cell in which no numerals are entered means that RBT call origination assistance was not performed at all in the relevant time zone on the relevant date. The number of days for which the record is made may be larger or smaller than that of the configuration as described herein.

The control unit 38 counts, as a determination index, a total of the number of times that RBT call origination assistance was performed or an average derived from dividing the total by the number of days in each time zone within the predetermined period of time. In the case the total number of times that RBT call origination assistance was performed between 12:00 and 13:00 in a period of 60 days is 120, for example, the determination index will be "120" or "120/60=2". When the determination index exceeds a predetermined value, the relevant time zone is defined as an RBT call origination reservation time zone. This process makes it possible to estimate in advance a time zone in which RBT call origination assistance is likely to occur, when processing a call subsequently. In the RBT call origination reservation time zone, the control unit 38 may switch from normal call origination to RBT call origination automatically when the talk button is held down.

Alternatively, the control unit 38 may calculate the total or average of the number of times that RBT call origination assistance was performed for each combination of the day of week and the time zone, and, when the value exceeds a predetermined value, the control unit 38 may automatically set RBT call origination. In other words, the control unit 38 may calculate the determination index for each combination of the day of week and the time zone. For example, the control unit 38 may automatically provide a setting such as "perform RBT call origination assistance between 12:00 and 15:00 on Wednesday and between 13:00 and 15:00 on Thursday". Alternatively, the control unit 38 may calculate the total or average of the number of times that RBT call origination assistance was performed for each combination of the date and the time zone, and, when the value exceeds a predetermined value, the control unit 38 may automatically set RBT call origination. For example, the control unit 38 may automatically provide a setting such as "perform RBT call origination assistance between 12:00 and 15:00 in a period between the 25th and the end of each month".

Alternatively, the control unit 38 may change the determination condition in S170 in accordance with the date and time when S170 of FIG. 8 is performed. For example, the control unit 38 may identify a period in which the determination index is relatively large, i.e., a period (date, day of week, time zone, etc.) in which the likelihood that RBT call origination assistance is set is high and may change the determination condition in S170 in the case the current time falls within the identified period. In the case the time zone between 13:00 and 14:00 after lunch is identified as a time zone in which RBT call origination assistance is set frequently, the control unit 38 may configure the threshold value used in S170 to be smaller when the current time falls within that time zone. This facilitates transition to S200. In other words, it makes it easier for RBT call origination to be performed. Alternatively, the control unit 38 may change the determination process in S170 for each combination of the day of week and the time zone or each combination of the date and the time zone, as described above. Further, the control unit 38 may not use the RBT call origination assistance time table. The user 18 of the terminal device 16 or the manager of the communication system 100 may register a specific period in advance, and the control unit 38 may change the determination condition in S170 depending on whether the current time falls within the particular period.

According to this embodiment, an RBT call generation assistance time table, in which the time when RBT call origination assistance occurred is aggregated over a long period of time, is created, and the process is performed by referring to the RBT call origination assistance time table. Accordingly, the communication mode is more properly selected by allowing for the habitual behavior of the user related to communication. Further, RBT call origination is selected depending on whether the call origination time falls within the RBT call origination reservation time zone. Accordingly, the selection process performed when making a call is simplified and the selection process can be performed in a shorter period of time as compared to the case of using the number of call origination records described in embodiment 1.

Embodiment 3

A description will now be given of embodiment 3. Like the foregoing embodiments, embodiment 3 relates to a communication system including a plurality of terminal devices that communicate with each other via a base station device and is directed to the purpose of using normal call origination and RBT call origination appropriately. In the foregoing embodiments, it is assumed that the communication process is performed only between two terminal devices. This embodiment assumes that one terminal device selects a communication partner arbitrarily from two or more terminal devices to make a call. Communication may be one-to-one two-party talk or a one-to-many group talk. The communication system 100 according to embodiment 3 is of the same as that of FIG. 1, and the terminal devices 16 are of the same type as those of FIGS. 4 and 5. The description below highlights a difference from embodiment 1.

The acquisition unit 50 of FIG. 5 acquires the reception time when a call signal is received from each of the plurality of terminal devices 16. The storage unit 40 stores the call origination time when a call signal is originated to each of the plurality of other terminal devices 16. For this purpose, a plurality of record tables 62 are provided for the respective terminal devices 16. The control unit 38 performs the RBT call origination assistance determination process described in embodiment 1 for each terminal device 16 to switch between normal call origination and RBT call origination. For example, it is assumed that five terminal devices 16 from the first terminal device 16a through the fifth terminal device 16e are included in the communication system 100. In this case, the record tables 62 related to the third terminal device 16c, the fourth terminal device 16d, and the fifth terminal device 16e not shown in FIG. 2 are included in the first terminal device 16a in addition to the record table 62 related to the second terminal device 16b shown in FIG. 2.

When the talk button is held down, the control unit 38 of the first terminal device 16a uses the record table 62 corresponding to the destination terminal device 16 to perform the same process as that of embodiment 1. The second terminal device 16b through the fifth terminal device 16e also perform a similar process when the talk button is held down. In other words, the control unit 38 selects either RBT call origination or normal call origination by referring to the reception time and the call origination time in relation to, of the plurality of other terminal devices 16, the other terminal device 16 targeted in communication. In this embodiment, the control unit 38 monitors the latest call origination assistance status in the record table 62 for each terminal device 16. The latest call origination status means the value of the call origination assistance status in the latest record in the record table 62 showing the call origination time or the reception time.

FIGS. 11A-11D show a data structure of the record table 62. The figures show an example of the record table 62 stored in the storage unit 40 of the first terminal device 16a. FIG. 11A shows a record between the first terminal device 16a and the second terminal device 16b. FIG. 11B shows a record between the first terminal device 16a and the third terminal device 16c, FIG. 11C shows a record between the first terminal device 16a and the fourth terminal device 16d, and FIG. 11D shows a record between the first terminal device 16a and the fifth terminal device 16e.

FIGS. 11A-11D correspond to the second terminal device 16b, the third terminal device 16c, the fourth terminal device 16d, and the fifth terminal device 16e, but there may be fewer or more record tables 62 for respective terminal devices 16 than in this configuration. A terminal device ID (terminal device identifier) for identifying the terminal device 16 is assigned to each table. In this configuration, the second terminal device 16b is identified by (ID:002), the third terminal device 16c (ID:003), the fourth terminal device 16d (ID:004), and the fifth terminal device 16e (ID:005).

The latest record and call origination assistance status of the second terminal device 16b are the call origination time "12:51:23" and the call origination assistance status "1" of the record No. 030. The latest record and call origination assistance status of the third terminal device 16c are the reception time "12:49:10" and the call origination assistance status "0" of the record No. 026. The latest record and call origination assistance status of the fourth terminal device 16d are the reception time "12:57:24" and the call origination assistance status "1" of the record No. 020. The latest record and call origination assistance status of the fifth terminal device 16e are the reception time "12:52:23" and the call origination assistance status "0" of the record No. 028.

The control unit 38 turns the call origination status of the terminal devices 16 into a list and displays the list in the display unit 36. The call origination status of the terminal devices 16 means the aforementioned latest call origination assistance status of the terminal devices 16. FIG. 12 shows an example of the screen displayed in the display unit 36. This is an example of the screen showing a list of the call origination status of the terminal devices 16. The name of each terminal device 16 is entered in the "terminal device" field, the terminal device ID (terminal device identifier) is entered in the "ID" field, the current call origination status (whether to perform normal call origination or RBT call origination) for each terminal device 16 is entered in the "call origination status" field. The call origination time or the reception time in the latest record in the record table 62 for each terminal device 16 is displayed in the "latest communication time" field. The list view of the call origination status may be updated by the control unit 38 at a predetermined interval (e.g., one minute) or may be updated when a record is appended to the record table 62 for any of the terminal devices 16.

In this embodiment, the record table 62 is made available for each terminal device 16, but an alternative method may be employed. For example, a column for the terminal device ID (terminal device identifier) may be added to the record table 62 so that the record for a plurality of terminal devices 16 may be kept in a single table.

According to this embodiment, the reception time and the call origination time for each of a plurality of other terminal devices are acquired. Therefore, either RBT call origination or normal call origination may be selected for any one of the plurality of other terminal devices to communicate with. Further, either RBT call origination or normal call origination is selected by referring to the reception time and the call origination time for the other terminal device targeted in communication. Therefore, RBT call origination assistance can be set for each of the other terminal devices.

Embodiment 4

A description will now be given of embodiment 4. Like the foregoing embodiments, embodiment 4 relates to a communication system including a plurality of terminal devices that communicate with each other via a base station device and is directed to the purpose of using normal call origination and RBT call origination appropriately. In the foregoing embodiments, the call origination time and the reception time are used. In embodiment 3, in particular, the record table records the call origination time when the first terminal device called another terminal device (the second terminal device through the fifth terminal device) and the reception time when a call was received from another terminal device (the second terminal device through the fifth terminal device). In embodiment 4, the call origination time and the reception time are not used. The communication system 100 according to embodiment 4 is of the same as that of FIG. 1, and the terminal devices 16 are of the same type as those of FIGS. 4 and 5. The description below highlights a difference from embodiment 1.

For example, the control unit 38 of the first terminal device 16*a* is provided with a counter for counting the number of times of call origination for each terminal device 16. FIG. 13 shows a data structure of the table showing the values of the counters maintained in the control unit 38 of the first terminal device 16*a*. The counters for the second terminal device 16*b* through the fifth terminal device 16*e* are indicated as the second counter through the fifth counter, respectively. By way of one example, the value of the second counter is "1", the value of the third counter is "3", value of the fourth counter is "2", and the value of the fifth counter is "0". The initial value of these counters is "0". Every time a call is transmitted to the terminal device 16 for which the number is counted, the count is incremented by "1". When communication is received from the terminal device 16 for which the number is counted, the counter is reset to "0". For example, the second counter is incremented by "1" every time the first terminal device 16*a* calls the second terminal device 16*b* and is reset to "0" when the first terminal device 16*a* receives from the second terminal devices 16*b*. The control unit 38 uses the counter configured as described above to determine in S170 of FIG. 8 whether the counter value is equal to larger than a threshold value (e.g., "3"). In the case of Yes, control unit 38 may proceed to S200. In the case of No, the control unit 38 may proceed to S220. In the case of the example shown in FIG. 13, Yes for the third counter, and No for the second counter, the fourth counter, and the fifth counter, given that the threshold value is "3".

In other words, the control unit 38 counts the number of times a signal was transmitted to another terminal device 16 since the time when a signal was received from the other terminal device 16 and causes the storage unit 40 to store the counted number. The storage unit 40 stores the number of times that a signal is transmitted to another terminal device 16 since the time when a signal was received from the other terminal device 16. The control unit 38 selects RBT call origination or normal call origination by referring to the number of times stored in the storage unit 40.

According to this embodiment, either RBT call origination or normal call origination is selected by referring to the number of times that a signal was transmitted to another terminal device since the time when a signal was received from the other terminal device. Accordingly, the use of the reception time and the call origination time is made unnecessary. Since the use of the reception time and the call origination time is made unnecessary, the process is simplified. Further, the number of times that a signal was transmitted to another terminal device since the time when a signal was received from the other terminal device is counted, and the counted number is stored in the storage unit. Accordingly, a smaller memory capacity is required for the process.

Embodiment 5

A description will now be given of embodiment 5. Like the foregoing embodiments, embodiment 5 relates to a communication system including a plurality of terminal devices that communicate with each other via a base station device and is directed to the purpose of using normal call origination and RBT call origination appropriately. In embodiment 1 through embodiment 3, the reception time when the user's terminal device received a call signal from another terminal device (hereinafter, referred to as "target terminal device") targeted for estimation of activity is used in order to estimate whether the user using the other terminal device is active. In embodiment 5, the call origination time when the target terminal device originated a call signal is used in place of the reception time. The reception time when the user's terminal device received from the target terminal device can be recorded only when the user's terminal device receives a call signal from the target terminal device. Meanwhile, the destination of a call signal originated by the target terminal device is not limited to the user's terminal device. Therefore, the call origination time when the target terminal device originated a call can be equally recorded when a call is made to a terminal device other than the user's terminal device. Therefore, the precision of estimating whether the user using the target terminal device is active or not is improved by using the call origination time than by using the reception time. The communication system 100 according to embodiment 5 is of the same as that of FIG. 1, and the terminal devices 16 are of the same type as those of FIGS. 4 and 5. The description below highlights a difference from embodiment 1. The reception time when the user's terminal device received a call signal from the target terminal device and the call origination time when the target terminal device transmitted a call signal to a partner terminal device (terminal devices other than the target terminal device including the user's terminal device) will be generically referred to as "reference time". By using a concept of reference time inclusive of the reception time when a signal was received from the target terminal device (another terminal device) and the call origination time when the target terminal device (another terminal device) originated a signal, this embodiment can be said to be equivalent to embodiments 1 through 3. In other words, like embodiments 1 through 3, this embodiment estimates the situation of activity of the user using another terminal device by using the reference time and the call origination time of the user's terminal device.

The communication unit 34 of FIG. 5 transmits the call origination time acquired by the control unit 38 to the management device 12. Transmission of the call origination time as described above is performed in each terminal device 16. Therefore, each terminal device 16 uploads the call origination time to the management device. The timing of upload is immediately when a call signal is originated, immediately when communication is ended, or at a predetermined interval (e.g., every minute).

The management device 12 of FIG. 1 stores the call origination time transmitted from each terminal device 16 via the base station device 14. FIG. 14 shows a data structure of the table stored in the management device 12. The figure can be said to show an exemplary configuration of the latest call origination time table of each terminal device 16 stored in the storage unit of the management device 12. The name of each terminal device is entered in the "terminal device" field, the terminal device ID (terminal device identifier) is entered in the "ID" field, and the latest call origination time when each terminal device 16 uploaded is entered in the "latest call origination time" field. The terminal device ID of the first terminal device 16*a* is "001" and the latest call origination time is "11:25:45". Assuming that the first terminal device 16*a* originates a call at "11:30:00" after the latest call origination time, the value of the latest call origination time is updated (overwritten) by "11:30:00". The management device 12 delivers the content of the latest call origination time table to the respective terminal devices 16 at a predetermined interval (e.g., every minute). Alternatively, the management device 12 may deliver the content immediately after the latest call origination time table is updated. Reference is made back to FIG. 5.

The acquisition unit 50 of the terminal device 16 acquires the latest call origination time of the respective terminal devices 16 from the latest call origination time table delivered from the management device 12. In other words, the acquisition unit 50 acquires the call origination time at the plurality of other terminal devices 16 collected by the management device 12 instead of the reception time. The control unit 38 creates the record table 62 by referring to the latest call origination time acquired from the management device 12. In the case the first terminal device 16*a* acquires the latest call origination time of seven terminal devices 16 (the first terminal device 16*a* through the seventh terminal device 16*g*) from the management device 12, the control unit 38 of the first terminal device 16*a* creates the record table 62 corresponding to each of the six terminal devices (the second terminal device 16*b* through the seventh terminal device 16*g*) excluding the first terminal device 16*a*, i.e., the user's terminal device. Unlike the record table 62 in embodiment 3, the "reception time" field is omitted. In other words, the record table 62 according to this embodiment is provided with the fields for the record No., call origination time, and call origination assistance status. Thus, the storage unit 40 stores the call origination time when the user's terminal device transmitted a call signal to each of the plurality of other terminal devices 16. The management device 12 may not deliver all data in the latest call origination time table. For example, the management device 12 may deliver, to the first terminal device 16*a*, data excluding the call origination time of the first terminal device 16*a*. Alternatively, the management device 12 may deliver only the data for the terminal device 16 subject to the RBT call origination assistance determination process. In the case the first terminal device 16*a* performs the RBT call origination assistance determination process only for the second terminal device 16*b* and does not perform it for the other terminal devices 16, the management device 12 may deliver only the call origination time of the second terminal device 16*b* to the first terminal device 16*a*. The process in this case corresponds to the RBT call origination assistance determination process performed in the first terminal device 16*a* for the second terminal device 16*b* described in embodiment 1.

The RBT call origination assistance determination process in the control unit 38 is similar to that of embodiment 1 but differs in the following respects. In S130 of FIG. 8, the control unit 38 acquires the latest call origination time corresponding to the destination terminal device 16 from the latest call origination time table. The subsequent steps from S140 to S150 are omitted. In S160, the control unit 38 refers to the call origination record for the destination terminal device 16 in the record table 62 to identify the call origination record having the time later than the latest call origination time acquired in S130 and counts the number of call origination records identified/The steps from S100 to S120 and from S170 to S230 are as similar. In other words, the control unit 38 selects, for a subject terminal device 16 of a plurality of other terminal devices 16, either RBT call origination or normal call origination by referring to the call origination time when the subject terminal device 16 called an arbitrary terminal device 16 and the call origination time when the user's terminal device called the subject terminal device 16.

In the foregoing embodiments, the RBT call origination assistance determination process is performed by using the record of communication between the terminal device 16 performing the RBT call origination assistance determination process and another terminal device 16. In the case the first terminal device 16*a* performs the process related to the destination second terminal device 16*b*, only the record of communication between the first terminal device 16*a* and the second terminal device 16*b* is used. Therefore, the record of communication between the second terminal device 16*b* and the third terminal device 16*c* or the record of communication between the second terminal device 16*b* and the fourth terminal device 16*d* is not used.

In this embodiment, on the other hand, the RBT call origination assistance determination process is performed by also using the call origination time when the second terminal device 16*b* called any of the third terminal device 16*c* through the seventh terminal device 16*g*. It is assumed, for example, that the second terminal device 16*b* called the first terminal device 16*a* and then the second terminal device 16*b* called the third terminal device 16*c*. The foregoing embodiments can only use the record of call origination from the second terminal device 16*b* to the first terminal device 16*a*. In this embodiment, however, the call origination time when the second terminal device 16*b* called the third terminal device 16*c* is reflected in the latest call origination time of the second terminal device 16*b*. Accordingly, the status of activity of the user 18 of the second terminal device 16*b* at the more recent time can be reflected in the process so that the precision of the RBT call origination assistance determination process is improved.

In further accordance with this embodiment, the status of activity of the user 18 of the terminal device 16 from which a call signal has not been received at all can be reflected in the process in the terminal device 16 (e.g., the first terminal device 16*a*) performing the RBT call origination assistance determination process. It is assumed, for example, that the sixth terminal device 16*f* has not called the first terminal device 16*a* at all, and the sixth terminal device 16*f* has frequently called terminal devices 16 other than the first terminal device 16*a*. In the foregoing embodiments, a determination of No is made in S140 of FIG. 8, and "000" is set in the variable NR in S150 so that it is likely that a determination of Yes is made in S170. In other words, a determination of inactivity will be made regardless of the fact that the sixth user 18*f* using the sixth terminal device 16*f* is active. Therefore, RBT call origination will be excessively used. In this embodiment, the latest call origination time of the sixth terminal device 16*f* is used in such a situation as well so that the status of activity of the sixth user 18*f* is determined more precisely than otherwise, and the precision of the RBT call origination assistance determination process is improved.

According to this embodiment, the management device collects the call origination time in each of the plurality of terminal devices and delivers the call origination time to the respective terminal devices. Accordingly, terminal devices that have not performed two-party communication directly can acquire the call origination time of the mutual terminal devices. Further, the acquired call origination time is used to perform the RBT call origination assistance determination process so that the precision of selection of the communication mode is improved.

Described above is an explanation based on an exemplary embodiment. The embodiment is intended to be illustrative only and it will be understood by those skilled in the art that various modifications to constituting elements and processes could be developed and that such modifications are also within the scope of the present invention.

According to the embodiment, the business wireless system is used in the communication system 100. Alternatively, a wireless communication system other than the business wireless system, such as a cellular phone system, may be used. According to this variation, the flexibility of the system is improved.

Arbitrary combinations of embodiments 1 through 5 are also useful. According to this variation, the benefit from the combination is obtained.

As in embodiment 3, wherein information on the plurality of terminal devices is recorded in the record table, information on the plurality of terminal devices may be similarly recorded in the RBT call origination assistance time record table in embodiment 2, and the RBT call origination reservation time zone may be set for each of the plurality of terminal devices.

Further, embodiment 2 and embodiment 4 may be combined, for example. More specifically, the number of times that a signal is transmitted to each of the plurality of terminal devices subject to the communication mode selection process after the time when a signal was received from the terminal device may be counted, and the communication mode may be selected by referring to the number of times. Further, the result of communication mode selection (the number of times that RBT call origination assistance was performed) for each time zone may be recorded for a predetermined period of time to calculate a determination index and set the RBT call origination reservation time zone. In other words, the determination index may be calculated by referring to the number of times of call origination since the point of time when a signal was received from the terminal device subject to the process.

What is claimed is:

1. A terminal device comprising:
an acquisition unit that acquires a reference time that is a reception time when a signal was received from another terminal or a call origination time when the other terminal device transmitted a signal;
a storage that stores a call origination time when the terminal device transmitted a signal to the other terminal device;
a controller that selects, by referring to the reference time acquired by the acquisition unit and the call origination time stored in the storage, a first communication mode in which communication is started after a predetermined user operation is performed in the other terminal device or a second communication mode in which communication is started even when the predetermined user operation is not performed in the other terminal device; and
a communication unit that transmits a signal to the other terminal device in accordance with the communication mode selected by the controller.

2. The terminal device according to claim 1, wherein the controller counts the number of occurrences of call origination time later than the most recent reference time, selects the first communication mode in a case the counted number is equal to or larger than a threshold value, and selects the second communication mode in a case the counted number is below the threshold value.

3. The terminal device according to claim 1, wherein the acquisition unit acquires the reference time of each of a plurality of other terminal devices,
the storage stores the call origination time when the terminal device transmitted a signal to each of the plurality of other terminal devices;
the controller selects, out of the plurality of other terminal devices, a terminal device targeted in communication, and selects the first communication mode or the second communication mode by referring to the acquired reference time and the stored call origination time corresponding to the selected terminal device.

4. The terminal device according to claim 1, wherein the communication unit transmits the call origination time stored in the storage to a management device, and
the acquisition unit acquires, as the reference time, the call origination time in a plurality of other terminal devices collected by the management device.

5. The terminal device according to claim 1, wherein the controller selects the first communication mode in a case a current time is a predetermined period of time or longer past the most recent reference time and selects the second communication mode otherwise.

6. A terminal device comprising:
a storage that stores the number of times a signal was transmitted to another terminal device since a time when a signal was received from another terminal device;
a controller that refers to the number of times stored in the storage to select a first communication mode in which communication is started after a predetermined user operation is performed in the other terminal device or a second communication mode in which communication is started even when the predetermined user operation is not performed in the other terminal device; and
a communication unit that transmits a signal to the other terminal device in accordance with the communication mode selected by the controller.

7. The terminal device according to claim 1, wherein the controller aggregates, over a predetermined period of time, a result of selection of a communication mode for each time zone, identifies a time zone in which the first communication mode is selected relatively frequently, and changes a condition for selecting a communication mode depending on whether the time zone is the identified time zone or one of the other time zones.

8. A non-transitory recording medium encoded with a program,
the program comprising computer-implemented modules including:
a module that acquires a reference time that is a reception time when a signal was received from a terminal or a call origination time when the terminal device transmitted a signal;
a module that stores a call origination time when a signal was transmitted to the terminal device;
a module that selects, by referring to the reference time acquired and the call origination time stored, a first communication mode in which communication is started after a predetermined user operation is performed in the terminal device or a second communication mode in which communication is started even when the predetermined user operation is not performed in the terminal device; and a module that transmits a signal to the terminal device in accordance with the communication mode selected.

* * * * *